US011515800B2

(12) United States Patent
Huang et al.

(10) Patent No.: US 11,515,800 B2
(45) Date of Patent: Nov. 29, 2022

(54) POWER APPARATUS APPLIED IN SST STRUCTURE AND THREE-PHASE POWER SOURCE SYSTEM HAVING THE SAME

(71) Applicant: DELTA ELECTRONICS, INC., Taoyuan (TW)

(72) Inventors: Wen-Lung Huang, Taoyuan (TW); Sheng-Hua Li, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/168,815

(22) Filed: Feb. 5, 2021

(65) Prior Publication Data

US 2021/0159812 A1 May 27, 2021

Related U.S. Application Data

(63) Continuation of application No. 16/562,074, filed on Sep. 5, 2019, now Pat. No. 10,944,338.

(30) Foreign Application Priority Data

Jul. 11, 2019 (CN) .......................... 201910624806.0

(51) Int. Cl.
*H02M 7/797* (2006.01)
*H02M 3/335* (2006.01)
(Continued)

(52) U.S. Cl.
CPC ..... *H02M 3/33584* (2013.01); *H02M 5/4585* (2013.01); *H02M 7/219* (2013.01);
(Continued)

(58) Field of Classification Search
CPC .... H02M 5/4585; H02M 7/219; H02M 7/483; H02M 7/4807; H02M 7/5387; H02M 7/797; H02M 7/81; H02M 2007/4815
See application file for complete search history.

(56) References Cited

U.S. PATENT DOCUMENTS

2003/0133317 A1* 7/2003 Norrga ................ H02M 7/483
363/127
2005/0111246 A1 5/2005 Lai et al.
(Continued)

FOREIGN PATENT DOCUMENTS

CN 105226957 A * 1/2016
CN 107070287 A * 8/2017 ................ H02J 3/46
(Continued)

*Primary Examiner* — Jue Zhang
(74) *Attorney, Agent, or Firm* — Muncy, Geissler, Olds & Lowe, P.C.

(57) ABSTRACT

A power apparatus applied in an SST structure includes a first AC-to-DC conversion unit, a first DC bus, an isolated transformer, a DC-to-AC conversion unit, a second AC-to-DC conversion unit, and a second DC bus. The first AC-to-DC conversion unit has a first bridge arm and a second bridge arm. The first DC bus provides a first DC voltage. The isolated transformer has a primary side and a secondary side. The DC-to-AC conversion unit has a third bridge arm and a fourth bridge arm. The second AC-to-DC conversion unit has a fifth bridge arm and a sixth bridge arm. The second DC bus provides a second DC voltage.

19 Claims, 4 Drawing Sheets

(51) Int. Cl.
  *H02M 5/458* (2006.01)
  *H02M 7/5387* (2007.01)
  *H02M 7/219* (2006.01)
  *H02M 7/48* (2007.01)
  *H02M 7/483* (2007.01)
  *H02M 7/81* (2006.01)
  *H02M 3/00* (2006.01)

(52) U.S. Cl.
  CPC ......... *H02M 7/483* (2013.01); *H02M 7/4807* (2013.01); *H02M 7/5387* (2013.01); *H02M 7/797* (2013.01); *H02M 7/81* (2013.01); *H02M 3/01* (2021.05); *H02M 7/4815* (2021.05)

(56) References Cited

U.S. PATENT DOCUMENTS

| | | | |
|---|---|---|---|
| 2006/0233000 A1* | 10/2006 | Akagi | H02M 5/4585 363/37 |
| 2013/0082528 A1 | 4/2013 | Wang et al. | |
| 2015/0029761 A1* | 1/2015 | Trinh | H02M 3/33507 363/17 |
| 2016/0352230 A1 | 12/2016 | Norimatsu et al. | |
| 2017/0005565 A1* | 1/2017 | Bai | H02M 1/15 |
| 2018/0175761 A1* | 6/2018 | Jha | H02P 9/007 |
| 2018/0198377 A1* | 7/2018 | Keister | H02M 1/42 |
| 2018/0212535 A1 | 7/2018 | Xia et al. | |
| 2018/0219501 A1 | 8/2018 | Wagoner et al. | |
| 2018/0351368 A1 | 12/2018 | Sun et al. | |
| 2021/0129701 A1* | 5/2021 | Brombach | H02J 7/0013 |
| 2021/0159812 A1* | 5/2021 | Huang | H02M 7/219 |

FOREIGN PATENT DOCUMENTS

| | | |
|---|---|---|
| CN | 109119984 A | 1/2019 |
| CN | 109600049 A1 | 4/2019 |
| EP | 3099153 A1 | 11/2016 |
| TW | 201315111 A | 4/2013 |
| TW | 201531007 A | 8/2015 |
| WO | WO-2005/055408 A1 | 6/2005 |
| WO | WO-2015/078838 A1 | 6/2015 |
| WO | WO-2017/098763 A1 | 6/2017 |

* cited by examiner

US 11,515,800 B2

POWER APPARATUS APPLIED IN SST STRUCTURE AND THREE-PHASE POWER SOURCE SYSTEM HAVING THE SAME

CROSS-REFERENCE TO RELATED APPLICATIONS

This application is a continuing application of U.S. patent application Ser. No. 16/562,074, filed on Sep. 5, 2019, and entitled "POWER APPARATUS APPLIED IN SST STRUCTURE AND THREE-PHASE POWER SOURCE SYSTEM HAVING THE SAME", which claims priority to Application No. 201910624806.0 filed on Jul. 11, 2019 in China. The entire disclosures of the above applications are all incorporated herein by reference.

BACKGROUND

Technical Field

The present disclosure relates to a power apparatus and a three-phase power source system having the same, and more particularly to a power apparatus applied in SST structure and a three-phase power source system having the same.

Description of Related Art

The statements in this section merely provide background information related to the present disclosure and do not necessarily constitute prior art.

With the development of power electronic components and the development of decentralized power supplies and smart power grids, solid state transformers (SST) have become an increasingly hot research topic. Solid state transformers have multi-functional and high-performance features, including integration of microgrid, correction of power factor, compensation of reactive power, isolation of fault current, adjustment of output voltage, and so on.

However, the power supply apparatus applied to the solid state transformer structure still faces problems that need to be solved, such as DC-side voltage balance, difficulty in wiring design, high labor and cost, complicated control circuit, incapable volume reduction, and so on. Therefore, how to design a power apparatus applied to in SST structure and a three-phase power source system having the same to solve the aforementioned technical problems is an important subject studied by the inventors of the present disclosure.

SUMMARY

An object of the present disclosure is to provide a power apparatus applied in an SST structure to solve the mentioned-above problems.

In order to achieve the above-mentioned object, the power apparatus applied in the SST structure includes a first AC-to-DC conversion unit, a first DC bus, an isolated transformer, a DC-to-AC conversion unit, a second AC-to-DC conversion unit, and a second DC bus. The first AC-to-DC conversion unit has a first three-level bridge arm and a second three-level bridge arm coupled to the first three-level bridge arm, and a first side of the first AC-to-DC conversion unit is coupled to an AC power source. The first DC bus is coupled to a second side of the first AC-to-DC conversion unit, and has a first DC voltage. The isolated transformer has a primary side and a secondary side. The DC-to-AC conversion unit has a third three-level bridge arm and a fourth three-level bridge arm coupled to the third three-level bridge arm, and a first side of the DC-to-AC conversion unit is coupled to the first DC bus and a second side of the DC-to-AC conversion unit is coupled to the primary side. The second AC-to-DC conversion unit has a fifth three-level bridge arm and a sixth three-level bridge arm coupled to the fifth three-level bridge arm, and a first side of the second AC-to-DC conversion unit is coupled to the secondary side. The second DC bus is coupled to a second side of the second AC-to-DC conversion unit, and has a second DC voltage.

Accordingly, the power apparatus applied in the SST structure is provided to make the layout easy, simply the design of the control circuit, and reduce the occupied volume of circuits.

Another object of the present disclosure is to provide a three-phase power system applied in an SST structure to solve the mentioned-above problems.

In order to achieve the above-mentioned object, any one phase of an AC power source is connected to a plurality of power apparatuses. The first AC-to-DC conversion units of the power apparatuses are coupled in series, and the second DC buses of the power apparatuses are coupled in parallel.

Accordingly, the three-phase power system applied in the SST structure is provided to make the layout easy, simply the design of the control circuit, reduce the occupied volume of circuits, and achieve the voltage equalization and power balance.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawings as follows.

DETAILED DESCRIPTION

Figure 1A:
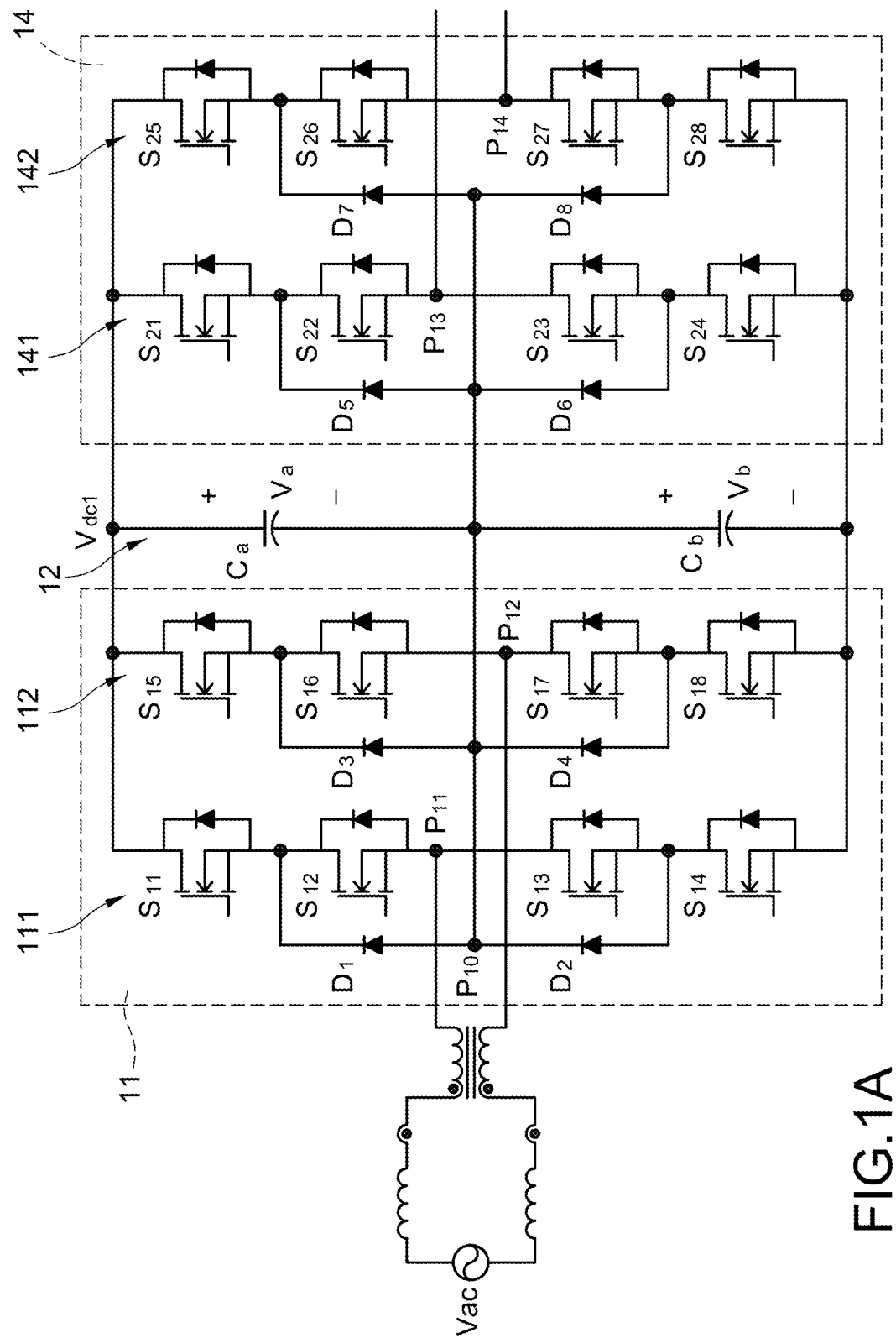
FIGS. 1A and 1B are circuit diagrams of a power apparatus applied in SST structure according to the present disclosure.

Reference will now be made to the drawing figures to describe the present disclosure in detail. It will be understood that the drawing figures and exemplified embodiments of present disclosure are not limited to the details thereof.

Figure 1B:
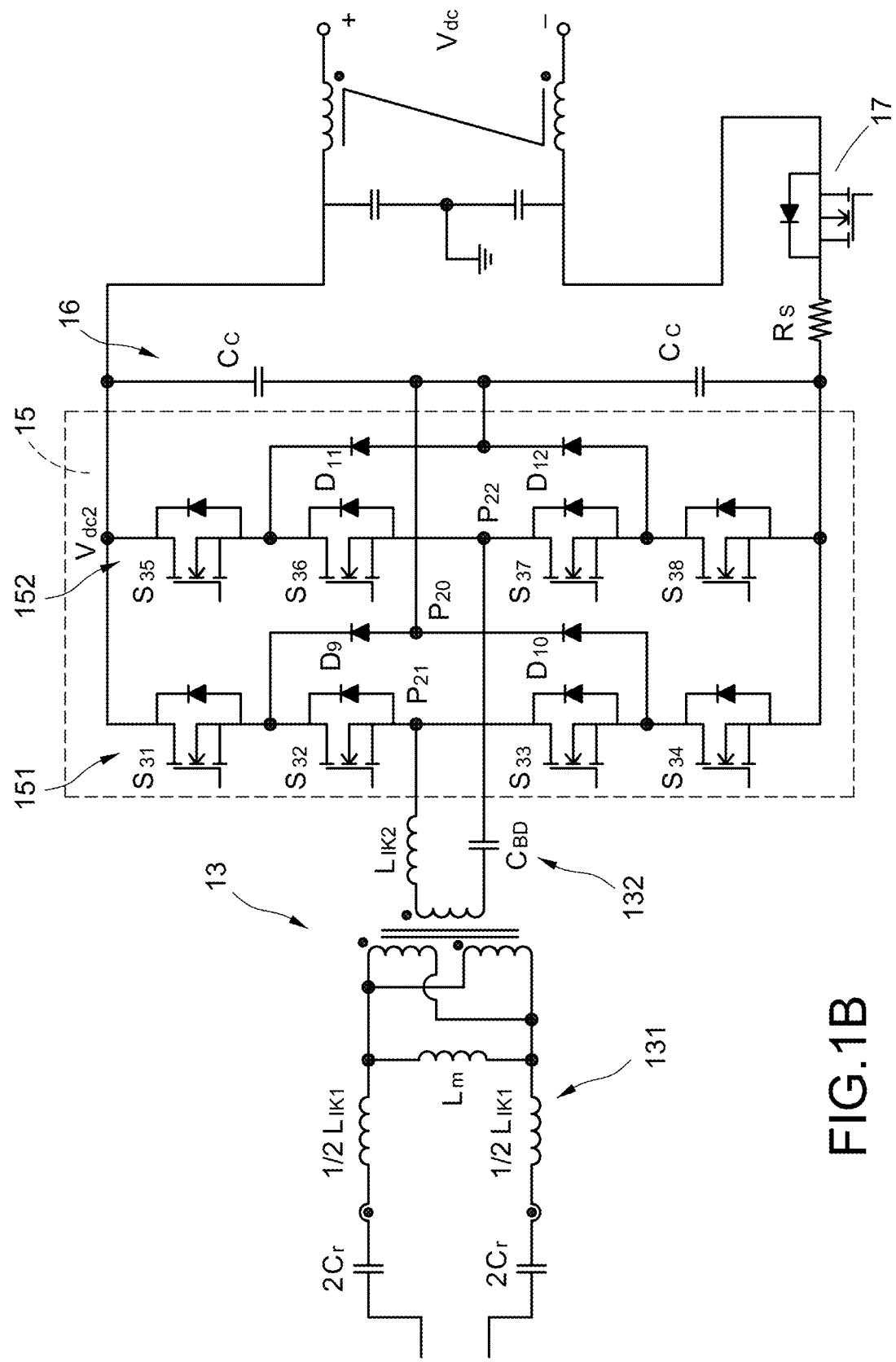

Please refer to FIG. 1A and FIG. 1B, which show a circuit diagram of a power apparatus applied in SST structure according to the present disclosure. The power apparatus applied in SST structure includes a first AC-to-DC conversion unit 11, a first DC bus 12, an isolated transformer 13, a DC-to-AC conversion unit 14, a second AC-to-DC conversion unit 15, and a second DC bus 16.

The first AC-to-DC conversion unit 11 has a first three-level bridge arm 111 and a second three-level bridge arm 112 coupled to the first three-level bridge arm 111. A first side of the first AC-to-DC conversion unit 11 is coupled to an AC power source Vac. The first DC bus 12 is coupled to a second side of the first AC-to-DC conversion unit 11, and has a first DC voltage Vdc1. The isolated transformer 13 has a primary side 131 and a secondary side 132.

The first AC-to-DC conversion unit 11 is coupled to the AC power source Vac (also referred to as "electric power grid") through an EMI transformer and a boost inductor.

The DC-to-AC conversion unit 14 has a third three-level bridge arm 141 and a fourth three-level bridge arm 142 coupled to the third three-level bridge arm 141. A first side of the DC-to-AC conversion unit 14 is coupled to the first DC bus 12 and a second side of the DC-to-AC conversion unit 14 is coupled to the primary side 131 of the isolated transformer 13. The DC-to-AC conversion unit 14 switches the voltage of the first DC bus 12 into a high-frequency AC signal and transmits the high-frequency AC signal through the isolated transformer 13. The second AC-to-DC conversion unit 15 has a fifth three-level bridge arm 151 and a sixth three-level bridge arm 152 coupled to the fifth three-level bridge arm 151. A first side of the second AC-to-DC conversion unit 15 is coupled to the secondary side 132 of the isolated transformer 13. The second DC bus 16 is coupled to a second side of the second AC-to-DC conversion unit 15, and has a second DC voltage Vdc2. The second AC-to-DC conversion unit 15 receives the high-frequency AC signal of the secondary side 132 of the isolated transformer 13, and converts the high-frequency AC signal into the second DC voltage Vdc2.

The first three-level bridge arm 111 has two in-series power switches S11, S12 and a diode D1 is coupled to a common contact between the power switches S11, S12, and two in-series power switches S13, S14 and a diode D2 is coupled to a common contact between the power switches S13, S14. The power switch S12 is coupled to the power switch S13 and commonly connected at a first contact P11, and the diode D1 is coupled to the diode D2 and commonly connected at a potential neutral point P10 so as to form a three-level bridge arm structure and to output three different voltage levels (shown in FIG. 3) by the three-level bridge arm structure. The power switches S11-S14 may be MOSFETs, IGBTs with anti-parallel diodes, or other semiconductor switches. Moreover, the power switches S11-S14 and the diodes D1, D2 can be integrated into a modular structure, thereby reducing pins, making the layout easy, and reducing the variance of the components.

The second three-level bridge arm 112 has two in-series power switches S15, S16 and a diode D3 is coupled to a common contact between the power switches S15, S16, and two in-series power switches S17, S18 and a diode D4 is coupled to a common contact between the power switches S17, S18. The power switch S16 is coupled to the power switch S17 and commonly connected at a second contact P12, and the diode D3 is coupled tot the diode D4 and commonly connected at the potential neutral point P10. The power switches S15-S18 may be MOSFETs, IGBTs with anti-parallel diodes, or other semiconductor switches. Moreover, the power switches S15-S18 and the diodes D3, D4 can be integrated into a modular structure. In addition, the first contact P11 and the second contact P12 of the first AC-to-DC conversion unit 11 are coupled to the AC power source Vac. Since the first three-level bridge arm 111 and the second three-level bridge arm 112 can respectively output three voltage level, a voltage between the first contact P11 and the second contact P12 can be controlled in different voltage levels, such as Vdc1, ½*Vdc1, 0, −½*Vdc1, −Vdc1, thereby reducing switch stress and reducing harmonics. The manner of generating the control signal may be, for example but not limited to, a space vector pulse width modulation (SVPWM). As long as different voltage levels can be generated between the first contact P11 and the second contact P12.

The third three-level bridge arm 141 has two in-series power switches S21, S22 and a diode D5 is coupled to a common contact between the power switches S21, S22, and two in-series power switches S23, S24 and a diode D6 is coupled to a common contact between the power switches S23, S24. The power switch S22 is coupled to the power switch S23 and commonly connected at a third contact P13, and the diode D5 is coupled to the diode D6 and commonly connected at the potential neutral point P10. The power switches S21-S24 may be MOSFETs, IGBTs with anti-parallel diodes, or other semiconductor switches. Moreover, the power switches S21-S24 and the diodes D5, D6 can be integrated into a modular structure.

The fourth three-level bridge arm 142 has two in-series power switches S25, S26 and a diode D7 is coupled to a common contact between the power switches S25, S26, and two in-series power switches S27, S28 and a diode D8 is coupled to a common contact between the power switches S27, S28. The power switch S26 is coupled to the power switch S27 and commonly connected at a fourth contact P14, and the diode D7 is coupled to the diode D8 and commonly connected at the potential neutral point P10. The power switches S25-S28 may be MOSFETs, IGBTs with anti-parallel diodes, or other semiconductor switches. Moreover, the power switches S25-S28 and the diodes D7, D8 can be integrated into a modular structure. In addition, the third three-level bridge arm 141 and the fourth three-level bridge arm 142 of the DC-to-AC conversion unit 14 can be three-level bridge arms, thereby reducing switch stress.

The fifth three-level bridge arm 151 has two in-series power switches S31, S32 and a diode D9 is coupled to a common contact between the power switches S31, S32, and two in-series power switches S33, S34 and a diode D10 is coupled to a common contact between the power switches S33, S34. The power switch S32 is coupled to the power switch S33 and commonly connected at a fifth contact P21, and the diode D9 is coupled to the diode D10 and commonly connected at a potential neutral point P20. The power switches S31-S34 may be MOSFETs, IGBTs with anti-parallel diodes, or other semiconductor switches. Moreover, the power switches S31-S34 and the diodes D9, D10 can be integrated into a modular structure, thereby reducing pins, making the layout easy, and reducing the variance of the components.

The sixth three-level bridge arm 152 has two in-series power switches S35, S36 and a diode D11 is coupled to a common contact between the power switches S35, S36, and two in-series power switches S37, S38 and a diode D12 is coupled to a common contact between the power switches S37, S38. The power switch S36 is coupled to the power switch S37 and commonly connected at a sixth contact P22, and the diode D11 is coupled to the diode D12 and commonly connected at the potential neutral point P20. The power switches S35-S38 may be MOSFETs, IGBTs with anti-parallel diodes, or other semiconductor switches. Moreover, the power switches S35-S38 and the diodes D11, D12 can be integrated into a modular structure, thereby reducing pins, making the layout easy, and reducing the variance of the components. In addition, the fifth contact P21 of the fifth three-level bridge arm 151 of the second AC-to-DC conversion unit 15 and the sixth contact P22 of the sixth three-level bridge arm 152 of the second AC-to-DC conversion unit 15 are coupled to the secondary side 132 of the isolated transformer 13 to receive the AC signal provided from the secondary side 132. Since the operation of the second AC-to-DC conversion unit 15 is similar to that of the first AC-to-DC conversion unit 11, the detail description is omitted here for conciseness.

In one embodiment, the first three-level bridge arm 111 to the sixth three-level bridge arm 152 can be the same modular structure, and therefore those modular bridge arms can be interchangeably used in the system to simplify installation time, prevent assembly errors, and simplify the design and control strategy of the control circuit.

The primary side 131 of the isolated transformer 13 has an LLC resonant tank. As shown in FIGS. 1A and 1B, the LLC resonant tank is presented in symmetrical parameters, i.e., each branch has a resonant capacitance (2Cr) and a leakage inductance (½Llk1). Alternatively, one branch having a resonant capacitance (Cr) and a leakage inductance (Llk1) can also be presented in asymmetrical parameters. The isolated transformer 13 is used as an electrical isolation between the circuits in the primary side 131 and the circuits in the secondary side 132.

The power apparatus applied in the SST structure of the present disclosure, the first DC voltage Vdc1 of the first DC bus 12 is substantially equal to or substantially similar to the second DC voltage Vdc2, for example but not limited to that the first DC voltage Vdc1 is 1,580 volts and the second DC voltage Vdc2 is 1,500 volts. Such a voltage is close to the power generation system of the photovoltaic power station, and it is suitable for connecting a DC voltage bus of the photovoltaic power station to perform power conversion and regulation. Accordingly, since the first three-level bridge arm 111 to the sixth three-level bridge arm 152 are the same modular structure (the same specification), the three-level bridge arms can be replaced by each other for the use of the system, thereby simplifying installation process and simplifying the design and control strategy of the control circuit.

The power apparatus has operation modes of bidirectional power flow, and the bidirectional operation modes include an energy-storing mode (also referred to as forward operation) and an energy-releasing mode (also referred to as reverse operation). The forward operation means that the power apparatus receives the AC power source Vac (or power provided by a grid), and the AC power source Vac is converted by the first AC-to-DC conversion unit 11, the DC-to-AC conversion unit 14, and the second AC-to-DC conversion unit 15 into the DC power source Vdc for supplying power to a DC load, such as a charging station or an energy storage system (ESS). The specific application may be, for example but not limited to, the electric energy provided from the grid is supplied to the charging station for charging the electric vehicle, or the off-peak operation of the grid or the excess power of the decentralized generator apparatus can be stored in the energy storage system.

On the contrary, the reverse operation means that the DC power source Vdc is converted by the second AC-to-DC conversion unit 15, the DC-to-AC conversion unit 14, and the first AC-to-DC conversion unit 11 into the AC power source Vac. The specific application may be, for example but not limited to, the DC power source outputted from the photovoltaic cell is used as compensation for regional peak power demand, adjustment of power supply quality, and is even sold to the power grid (electric power company). In addition, the circuit of the power supply apparatus exhibits a symmetrical configuration, which simplifies the design and control strategy of the control circuit in the forward and reverse operations.

In one embodiment, a switching frequency of the power switches S11-S18 of the first three-level bridge arm 111 and the second three-level bridge arm 112 is a first switching frequency, and a switching frequency of the power switches of the third three-level bridge arm 141, the fourth three-level bridge arm 142, the fifth three-level bridge arm 151, and the sixth three-level bridge arm 152 is a second switching frequency. In particular, the first switching frequency is less than the second switching frequency. For example, the first switching frequency is between 7 kHz to 12 kHz, and the second switching frequency is between 200 kHz to 400 kHz. Specifically, since the DC-to-AC conversion unit 14, the second AC-to-DC conversion unit 15, and the LLC resonant tank form a resonant conversion circuit, the power switches of the third three-level bridge arm 141 and the fourth three-level bridge arm 142 and the power switches of the fifth three-level bridge arm 151 and the sixth three-level bridge arm 152 operate in soft switching. Therefore, the second switching frequency can be up to between 200 kHz to 400 kHz to reduce the size of the transformer, that is, compared with the line-frequency transformer in the traditional power system, the isolated transformer 13 achieves the purpose of electrical isolation and is significantly reduced in size. In addition, since the power switches of the first three-level bridge arm 111 and the second three-level bridge arm 112 of the first AC-to-DC conversion unit 11 operate in hard switching, the first switching frequency is smaller than the second switching frequency, for example between 7 kHz and 12 kHz so that the switching loss of the first AC-to-DC conversion unit 11 can be reduced to improve the efficiency.

The power apparatus of the present disclosure further includes a series-connected switch unit 17, and the switch unit 17 is coupled on a branch of a second side of the second AC-to-DC conversion unit 15. When a plurality of power apparatuses is used in parallel, the switch unit 17 can be turned off so that the output of the power apparatuses does not affect the system voltage of the parallel-connected architecture.

Figure 2:
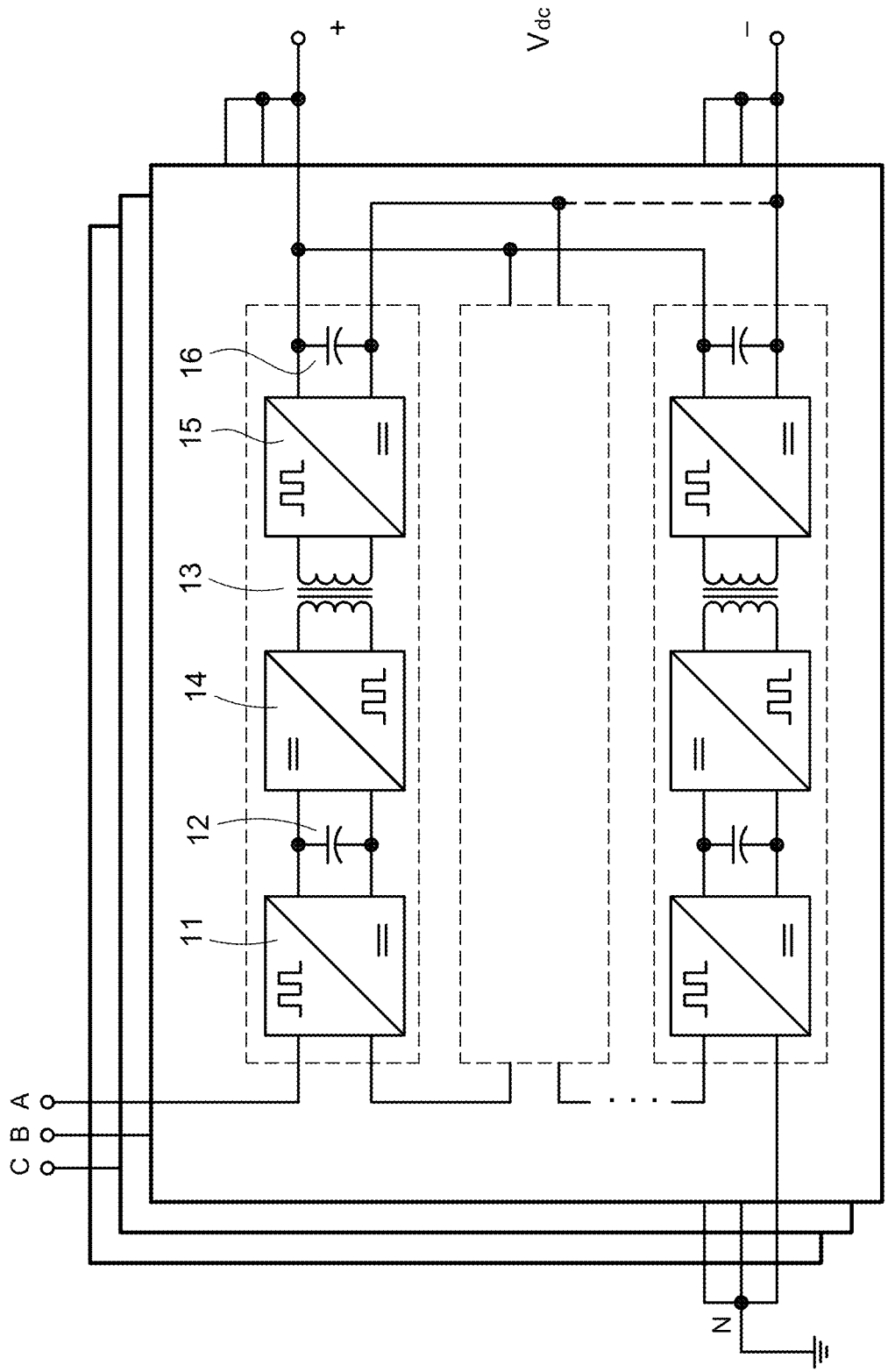
FIG. 2 is a block diagram of a three-phase power source system applied in SST structure according to the present disclosure.

Please refer to FIG. 2, which shows a block diagram of a three-phase power source system applied in SST structure according to the present disclosure. FIG. 2 shows that the three-phase power source system includes a plurality of power apparatuses. In the AC power source side, the power apparatuses are connected in series, and the second DC buses 16 are connected in parallel. Specifically, take the A phase of the three-phase power source for example, the number of the power apparatuses with multi isolated DC power sources is determined by a ratio of a system voltage to a withstand voltage of each power apparatus. For example, if a line voltage of the system voltage is 13.2 kV (i.e., a phase voltage is 7.62 kV) and the withstand voltage of each apparatus is 0.866 kV, the number of the power apparatuses in each phase is nine. Therefore, the first AC-to-DC conversion units 11 of the nine power apparatuses are coupled in series and the second DC buses 16 of the nine power apparatuses are coupled in parallel to commonly provide the DC power source Vdc (under the forward operation) to supply power to the charging station or the energy storage system, or to commonly receive the DC power source Vdc (under the reverse operation) from the photovoltaic cell. In addition, each phase architecture shown in FIG. 2 can be combined into a three-phase multi-group architecture. Specifically, the AC power source side is connected by a wye (Y) connection and a grounded neutral point N, and each group of the three-phase power apparatuses can be coupled in parallel. Take the nine power apparatuses per phase for example, by combining the power apparatuses in the three phases, the twenty-seven second DC buses 16 are connected in parallel, thereby achieving the voltage equalization and power balance. Take the charging station for example, the required power of the charging station can be supplied by the DC power source Vdc provided by the twenty-seven power apparatuses. In particular, the twenty-seven power apparatuses can, for example but not limited to, averagely or proportionally provide the required power for the charging station.

Figure 3:
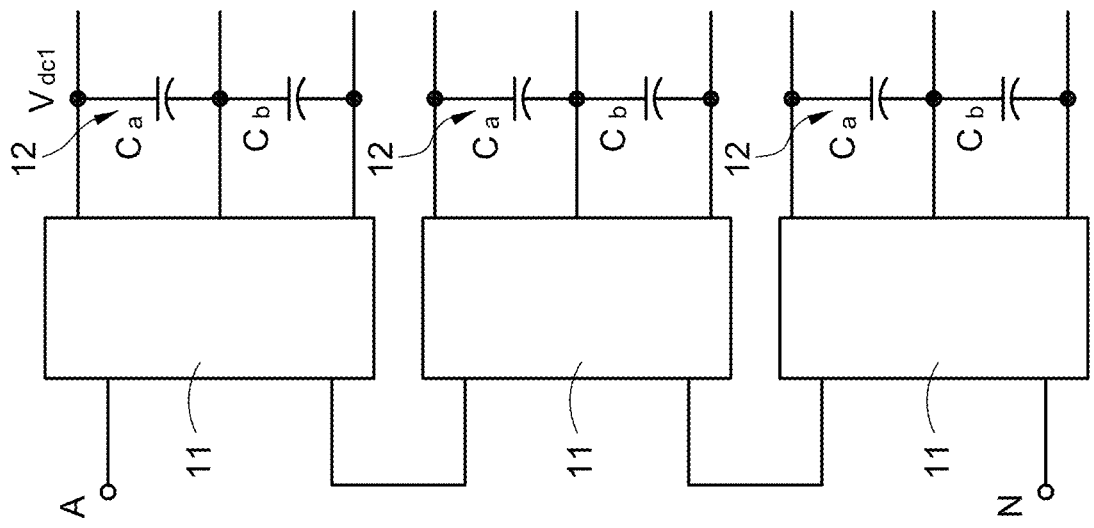
FIG. 3 is a schematic view of an interleaved phase-shift control of a first AC-to-DC conversion unit according to the present disclosure.
Figure 3:
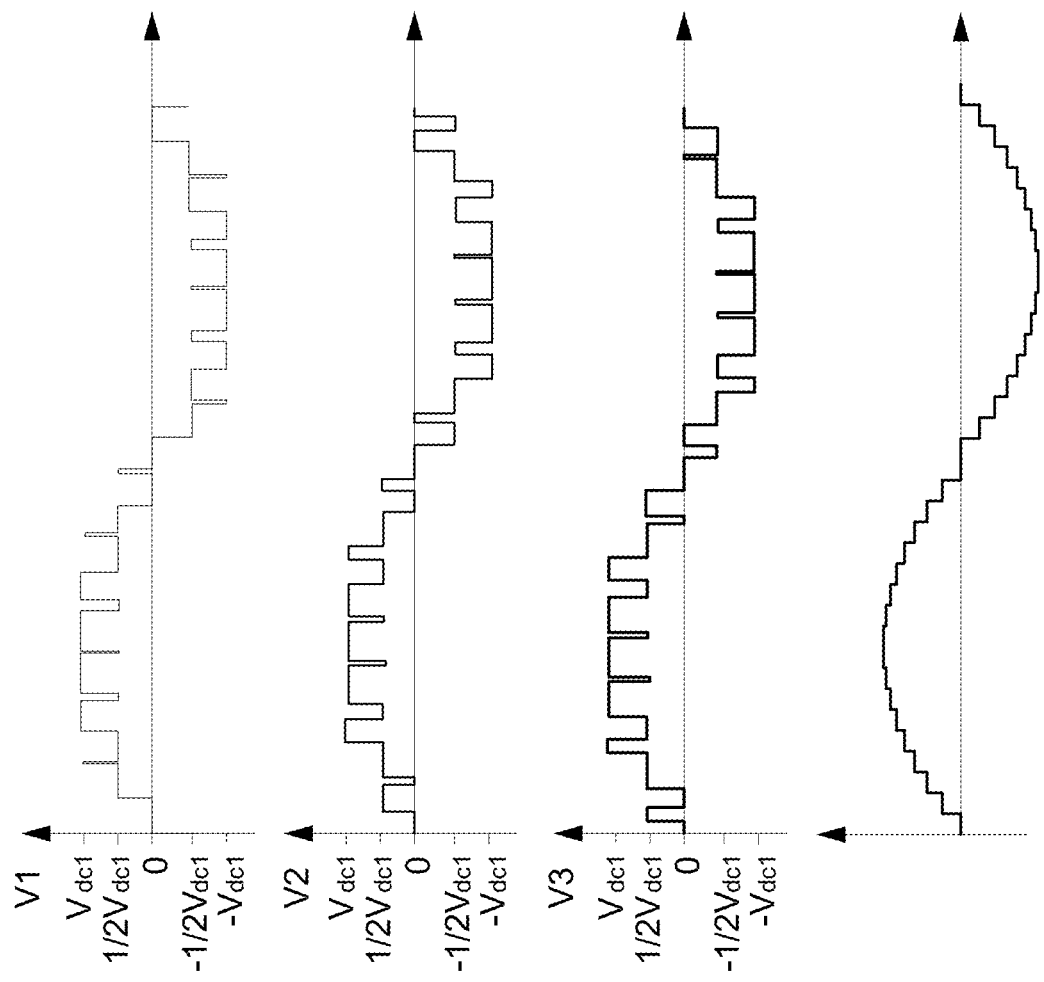

Please refer to FIG. 3, which shows a schematic view of an interleaved phase-shift control of a first AC-to-DC conversion unit according to the present disclosure. The first AC-to-DC conversion units 11 of each phase of the three-phase power source system are controlled by an interleaved phase-shift manner. Take three power apparatuses of each phase as an example, the voltage between the first contact P11 and the second contact P12 of each first AC-to-DC conversion unit 11 is controlled as a first voltage V1, a second voltage V2, and a third voltage V3, respectively. In particular, each of the first voltage V1, the second voltage V2, and the third voltage V3 has a plurality of voltage levels involving Vdc1, ½*Vdc1, 0, –½*Vdc1, –Vdc1. Each of the first AC-to-DC conversion unit 11 corresponding to the voltage V1~V3 is switching in 10 kHz with 120 degrees phase-shifted, and therefore a frequency (system frequency) of a phase voltage VAN of each phase can be multiplied to 30 kHz. Accordingly, each group of the first AC-to-DC conversion unit 11 can have a lower switching frequency, which can improve the efficiency, and the system has a better total harmonic distortion (THD) so that smaller filter components can be used.

In conclusion, the present disclosure has following features and advantages:

1. The solid state transformer is used to replace the conventional transformer, thereby increasing efficiency and reducing the occupied volume.

2. The three-level bridge arms (including the first three-level bridge arm to the sixth three-level bridge arm) form modular structures, thereby reducing pins, making the layout easy, and reducing the variance of the components.

3. The first three-level bridge arm to the sixth three-level bridge arm can be the same modular structure, and therefore those modular bridge arms can be interchangeably used in the system to simplify installation time, prevent assembly errors, and simplify the design and control strategy of the control circuit.

4. The first three-level bridge arm and the second three-level bridge arm (the third three-level bridge arm and the fourth three-level bridge arm, and the fifth three-level bridge arm and the sixth three-level bridge arm) can be three-level bridge arms, thereby reducing switch stress and reducing harmonics.

5. Since the DC-to-AC conversion unit, the second AC-to-DC conversion unit, and the LLC resonant tank form a resonant conversion circuit, the power switches of the third three-level bridge arm and the fourth three-level bridge arm and the power switches of the fifth three-level bridge arm and the sixth three-level bridge arm operate in soft switching, and therefore the second switching frequency can be up to between 200 kHz to 400 kHz to significantly reduce the size of the transformer.

6. By combining the power apparatuses in the three phases to make the second DC buses be connected in parallel, thereby achieving the voltage equalization and power balance.

7. By controlling the first AC-to-DC conversion units of each phase of the three-phase power source system in the interleaved phase-shift manner to make the first AC-to-DC conversion unit have a lower switching frequency, which can improve the efficiency, and the system has a better total harmonic distortion (THD) so that smaller filter components can be used.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power apparatus applied in a solid state transformer structure, comprising:
a first AC-to-DC conversion unit having a first bridge arm and a second bridge arm coupled to the first bridge arm, and a first side of the first AC-to-DC conversion unit coupled to an AC power source,
a first DC bus coupled to a second side of the first AC-to-DC conversion unit, and having a first DC voltage,
an isolated transformer having a primary side and a secondary side,
a DC-to-AC conversion unit having a third bridge arm and a fourth bridge arm coupled to the third bridge arm, and a first side of the DC-to-AC conversion unit coupled to the first DC bus and a second side of the DC-to-AC conversion unit coupled to the primary side,
a second AC-to-DC conversion unit having a fifth bridge arm and a sixth bridge arm coupled to the fifth bridge arm, and a first side of the second AC-to-DC conversion unit coupled to the secondary side, and
a second DC bus coupled to a second side of the second AC-to-DC conversion unit, and having a second DC voltage,
wherein a switching frequency of the first bridge arm and the second bridge arm is a first switching frequency, a switching frequency of the three bridge arm, the fourth bridge arm, the fifth bridge arm, and the sixth bridge arm is a second switching frequency, and the first switching frequency is different from the second switching frequency.

2. The power apparatus applied in the solid state transformer structure in claim 1, wherein any one of the first bridge arm to the sixth bridge arm is a modular structure.

3. The power apparatus applied in the solid state transformer structure in claim 2, wherein the first bridge arm to the sixth bridge arm are the same modular structure.

4. The power apparatus applied in the solid state transformer structure in claim 3, wherein each of the first bridge arm to the sixth bridge arm is a three-level bridge arm.

5. The power apparatus applied in the solid state transformer structure in claim 2, wherein each of the first bridge arm to the sixth bridge arm is a three-level bridge arm.

6. The power apparatus applied in the solid state transformer structure in claim 1, wherein each of the first bridge arm to the sixth bridge arm is a three-level bridge arm.

7. The power apparatus applied in the solid state transformer structure in claim 1, wherein the first bridge arm has a first contact coupled to the AC power source, the second bridge arm has a second contact coupled to the AC power source, and there is a plurality of different voltage levels between the first contact and the second contact.

8. The power apparatus applied in the solid state transformer structure in claim 1, wherein the primary side of the isolated transformer has an LLC resonant tank.

9. The power apparatus applied in the solid state transformer structure in claim 1, wherein the first DC voltage is substantially equal to or substantially similar to the second DC voltage.

10. The power apparatus applied in the solid state transformer structure in claim 1, wherein the power apparatus has an operation mode of bidirectional power flow.

11. The power apparatus applied in the solid state transformer structure in claim 1, wherein the first switching frequency is less than the second switching frequency.

12. The power apparatus applied in the solid state transformer structure in claim 11, wherein the first switching frequency is between 7 kHz and 12 kHz.

13. The power apparatus applied in the solid state transformer structure in claim 11, wherein the second switching frequency is between 200 kHz and 400 kHz.

14. The power apparatus applied in the solid state transformer structure in claim 1, wherein the second side of the second AC-to-DC conversion unit has a series-connected switch unit.

15. A three-phase power system applied in a solid state transformer structure, any one phase of an AC power source is connected to a plurality of power apparatuses, and each of the power apparatuses comprising:
   a first AC-to-DC conversion unit having a first bridge arm and a second bridge arm coupled to the first bridge arm, and a first side of the first AC-to-DC conversion unit coupled to an AC power source,
   a first DC bus coupled to a second side of the first AC-to-DC conversion unit, and having a first DC voltage,
   an isolated transformer having a primary side and a secondary side,
   a DC-to-AC conversion unit having a third bridge arm and a fourth bridge arm coupled to the third bridge arm, and a first side of the DC-to-AC conversion unit coupled to the first DC bus and a second side of the DC-to-AC conversion unit coupled to the primary side,
   a second AC-to-DC conversion unit having a fifth bridge arm and a sixth bridge arm coupled to the fifth bridge arm, and a first side of the second AC-to-DC conversion unit coupled to the secondary side, and
   a second DC bus coupled to a second side of the second AC-to-DC conversion unit, and having a second DC voltage,
   wherein a switching frequency of the first bridge arm and the second bridge arm is a first switching frequency, a switching frequency of the three bridge arm, the fourth bridge arm, the fifth bridge arm, and the sixth bridge arm is a second switching frequency, and the first switching frequency is different from the second switching frequency,
   wherein the first AC-to-DC conversion units of the power apparatuses are coupled in series, and the second DC buses of the power apparatuses are coupled in parallel.

16. The three-phase power system applied in the solid state transformer structure in claim 15, wherein each of the first bridge arm to the sixth bridge arm is a three-level bridge arm.

17. The three-phase power system applied in the solid state transformer structure in claim 15, the first AC-to-DC conversion units in each phase are controlled by an interleaved phase-shift manner.

18. The three-phase power system applied in the solid state transformer structure in claim 15, wherein the number of the power apparatuses in each phase is determined by a ratio of a system voltage to a withstand voltage of each power apparatus.

19. The three-phase power system applied in the solid state transformer structure in claim 15, wherein the second DC bus in each phase is coupled to one of a charging station, a photovoltaic cell, and an energy storage system.

* * * * *